United States Patent
Rankin

[19]

[11] Patent Number: 6,164,121
[45] Date of Patent: Dec. 26, 2000

[54] OIL SEAL ORIENTATION DETECTION

[75] Inventor: Brent C. Rankin, Lima, Ohio

[73] Assignees: Honda of America, Mfg., Anna; Honda Transmission Manufacturing of America, Inc., Russells Point, both of Ohio

[21] Appl. No.: 09/213,973

[22] Filed: Dec. 17, 1998

[51] Int. Cl.[7] .............................. G01M 3/08; G01M 3/26
[52] U.S. Cl. ..................................... 73/37; 73/46; 73/49.2
[58] Field of Search ................................ 73/37, 40, 40.7, 73/52, 46, 47, 49.3, 1.17, 49.8; 29/407.08

[56] References Cited

U.S. PATENT DOCUMENTS

| | | | |
|---|---|---|---|
| 3,270,960 | 9/1966 | Phillips | 73/37 |
| 3,956,604 | 5/1976 | Larker et al. | 73/40 |
| 5,265,464 | 11/1993 | Caron et al. | 73/37 |
| 5,412,978 | 5/1995 | Boone et al. | 73/40 |

*Primary Examiner*—Hezron Williams
*Assistant Examiner*—Michael Cygan
*Attorney, Agent, or Firm*—Barbara Joan Haushalter; Alan T. McDonald

[57] ABSTRACT

A system is provided for detecting the presence of and confirming the correct orientation of an oil seal. The system comprises a sensor orifice, a flow regulator for regulating flow of air to the sensor orifice, a pressure regulator for regulating air pressure to the flow regulator, and an air supply means for supplying air to the pressure regulator. A vent orifice is also provided for allowing air flow to exit from the sensor orifice when the oil seal is incorrectly oriented. The system further comprises an air pressure sensor, whereby when the oil seal is correctly oriented, with its flat side blocking the sensor orifice, a back pressure of air is created in the sensor orifice and the air supply means, the back pressure detectable by the air pressure sensor to confirm presence and correct orientation of the oil seal.

6 Claims, 3 Drawing Sheets

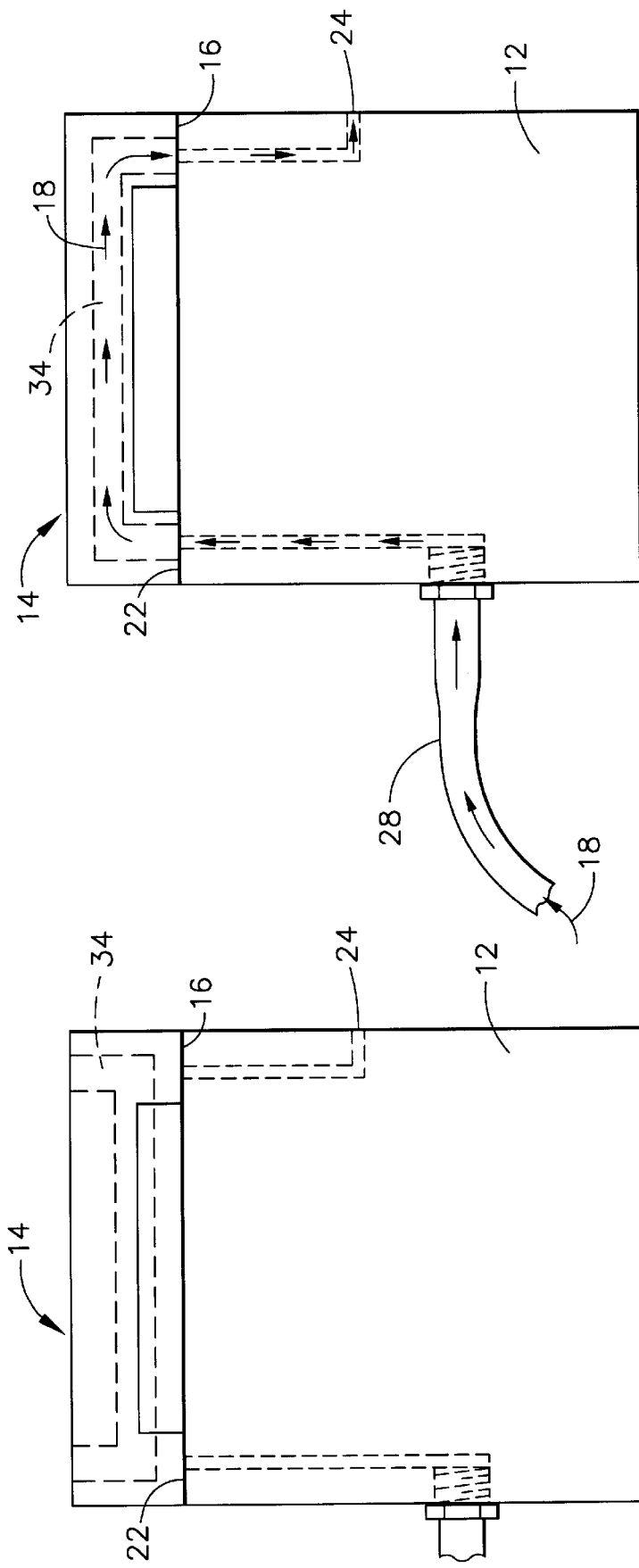

OIL SEAL ORIENTATION DETECTION

FIELD OF THE INVENTION

This invention relates generally to oil seals in an automatic transmission, and more particularly, to determining the presence and orientation of an oil seal disposed between a torque converter and a transmission case.

BACKGROUND OF THE INVENTION

Usually, an oil pump is disposed between the torque converter housing and the transmission case. The oil pump transmits the engine output torque which it receives from the pump impeller hub of the torque converter and generates a line pressure in a hydraulic control device for engaging or disengaging friction engaging devices, and lubricating rotational members.

In a typical arrangement, an O-ring is disposed between an outer side of an oil pump body and a torque converter housing, and an oil sealing member is disposed between the circumference of an oil pump body and a pump impeller hub of a torque converter in order to prevent a hydraulic fluid in the oil pump from leaking to the torque converter.

The presence of the oil seal is, of course, necessary to prevent leakage in and around the automatic transmission. Heretofore, it has not been possible to automatically confirm the presence of the seal.

Furthermore, the oil seal tends to appear the same when it is upside down (and incorrectly oriented) as when it is right side up (and correctly oriented). Therefore, even if the oil seal is present, it has heretofore not been possible to automatically confirm that the seal is correctly oriented. Therefore, a seal may inadvertently be oriented upside down. Consequently, in spite of the intention to reproduce identical components, it happens that occasionally one or more components will be improperly assembled. In some instances, the defect can be quickly spotted and corrected; but in other instances, a defect may not be obvious until the component or vehicle reaches the consumer.

Therefore, among the purposes of this invention is to detect the presence of an oil seal in an automatic installation system.

Also a purpose of this invention is the capability of confirming the correct orientation of the oil seal in an automatic installation system.

SUMMARY OF THE INVENTION

These purposes are achieved by the seal position detection system according to the present invention, wherein the presence of and orientation of an oil seal can be detected in an automatic installation system.

In accordance with one embodiment of the present invention, a system is provided for detecting the presence of and confirming the correct orientation of an oil seal. The system comprises a sensor orifice, a flow regulator for regulating flow of air to the sensor orifice, a pressure regulator for regulating air pressure to the flow regulator, and an air supply means for supplying air to the pressure regulator. A vent orifice is also provided for allowing air flow to exit from the sensor orifice when the oil seal is incorrectly oriented. The system further comprises an air pressure sensor, whereby when the oil seal is correctly oriented, with its flat side blocking the sensor orifice, a back pressure of air is created in the sensor orifice and the air supply means, the back pressure detectable by the air pressure sensor to confirm presence and correct orientation of the oil seal.

The primary advantage provided by the present invention is to detect the presence of an oil seal and to confirm the correct orientation of an oil seal in an automatic installation system.

Other objects and advantages of the invention will be apparent from the following description, the accompanying drawings and the appended claims, to which reference may be had for a full understanding of the nature of the present invention.

BRIEF DESCRIPTION OF THE DRAWINGS

In the Drawings:

FIGS. 3 and 4 are enlarged views of the seal detect of FIGS. 1 and 2, with the seal in a correct (face down) orientation and an incorrect (face up) orientation, respectively.

DESCRIPTION OF THE PREFERRED EMBODIMENT

Figure 1:
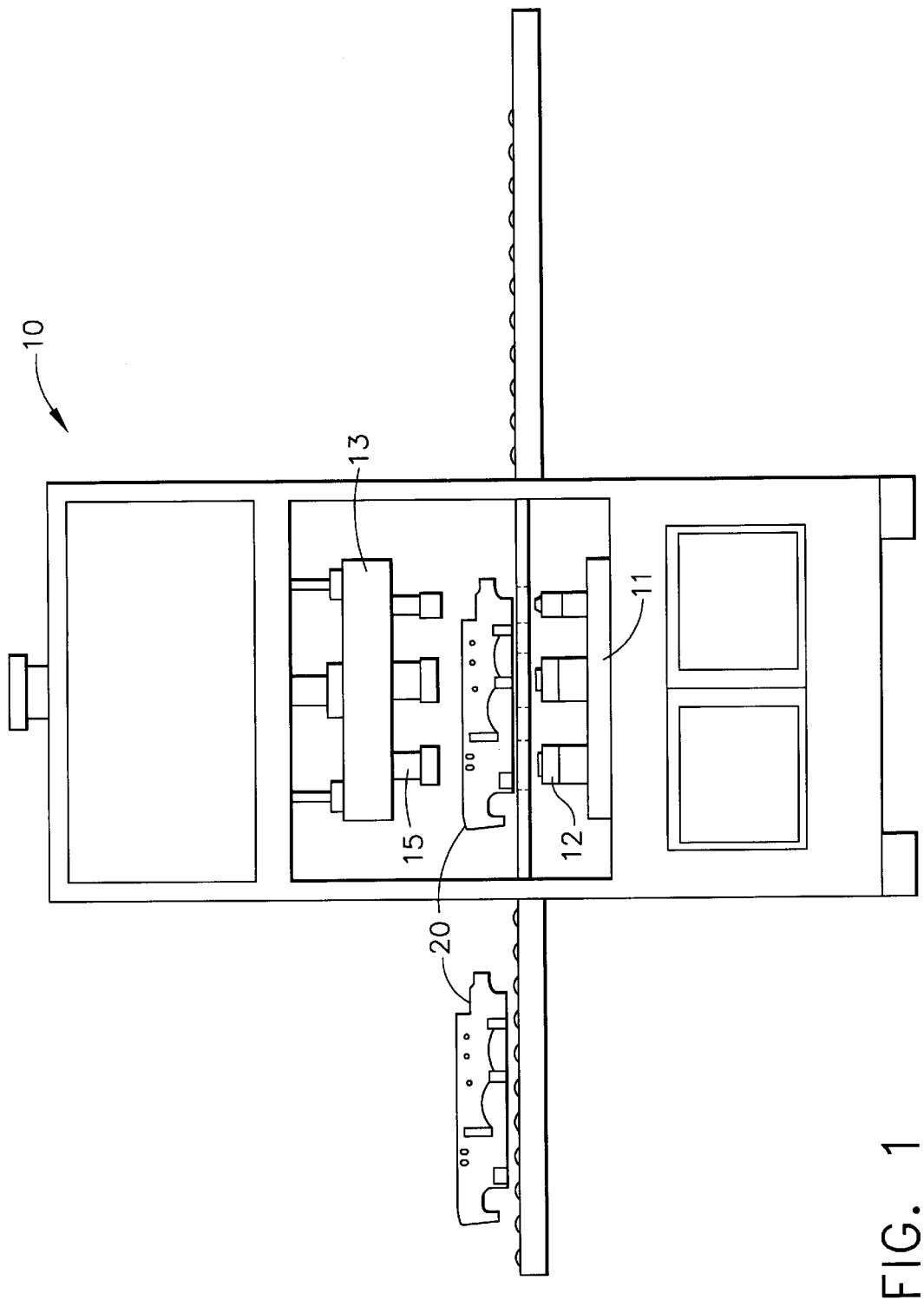
FIG. 1 illustrates a torque converter case bearing and seal press machine incorporating the seal position detect of the present invention within that system.

In accordance with the present invention, a torque converter case bearing and seal press machine 10 is illustrated in FIG. 1, comprising a seal position detect jig 12, illustrated in FIGS. 1–4. The press machine 10 further comprises associated lower and upper (backup) gang heads 11 and 13, respectively, and a backup jig 15. When an oil seal 14, as shown in FIGS. 3 and 4, is to be installed in the transmission torque converter case 10 of an automobile automatic transmission, the seal 14 is placed on surface 15 of the lower main seal jig 12 in a face-down orientation, as illustrated in FIG. 3. If the seal 14 is improperly oriented, i.e., with the flat side 16 face up, and surface 17 abutting surface 15, the consequent air flow in the direction of arrows 18 will prevent the required back pressure from developing.

In a typical automatic installation system, the pressing machine 10 of FIG. 1 is cycled and the main seal jig 12 is moved into the torque converter case 20, pressing the seal 14 into the correct location. In the prior art, it was not possible to automatically confirm whether the seal 14 was correctly orientated, incorrectly oriented, or even missing.

In accordance with the present invention, a seal position detect enhancement to the main seal jig 12 provides a means for automatically determining if the seal 14 is present in the torque converter case 20, and further confirming if the orientation of the seal 14 is correct.

Figure 2:
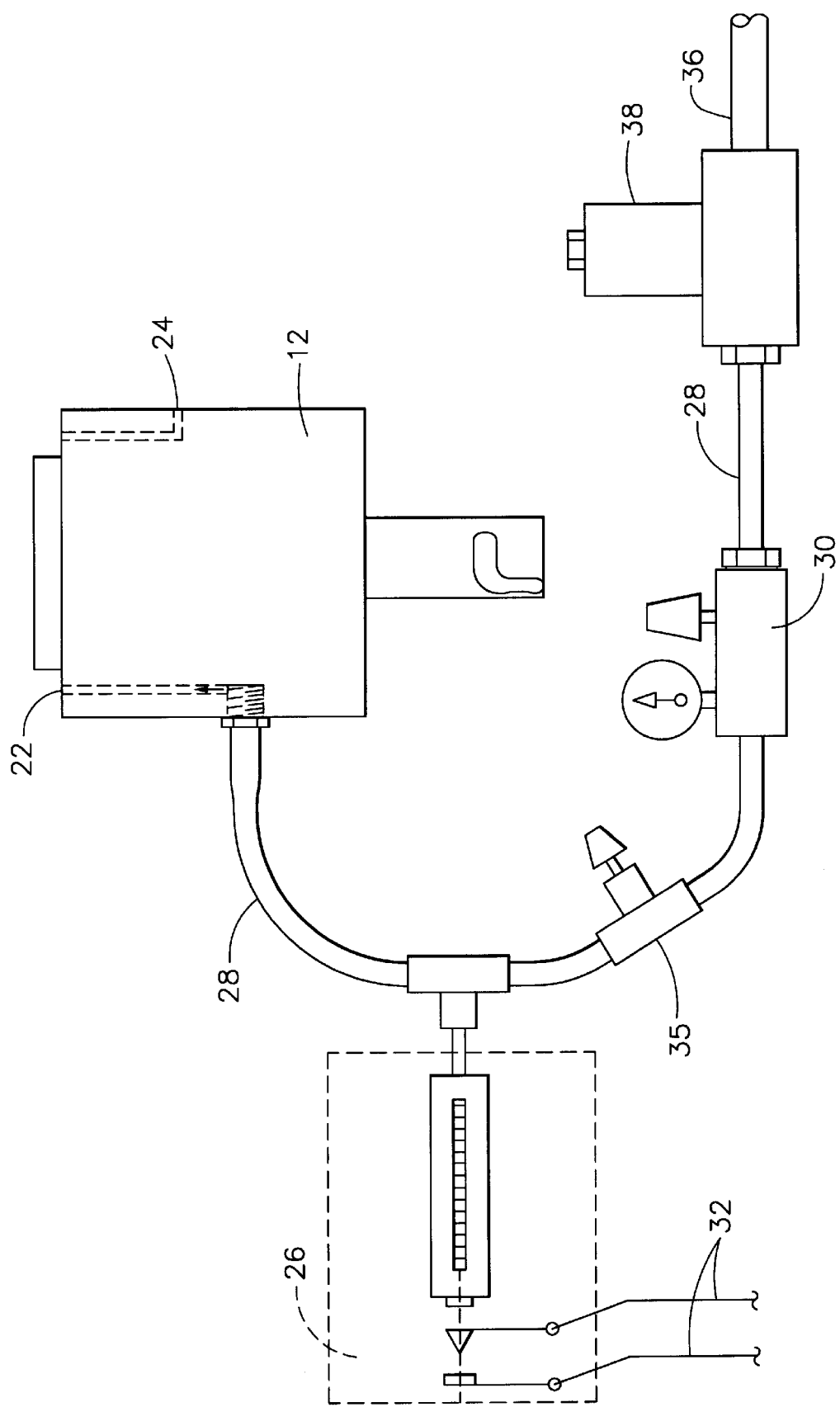
FIG. 2 is an enlarged view of the seal position detect assembly of the apparatus of FIG. 1.

Continuing with FIG. 2, the detector means of the present invention comprises a sensor orifice 22, a vent orifice 24, and an air pressure sensor 26. A regulated amount of air is supplied to the sensor orifice 22 by an air-line 28. Air enters the system at air supply entrance 36 through a solenoid valve 38. Air-flow and pressure regulation is performed by in-line regulator 30 and flow regulator 35. If the seal 14 being installed is correctly orientated, as illustrated in FIG. 3, then the sensor orifice 22 is covered by flat side 16 of seal 14, causing a back pressure of air in the sensor orifice 22 and attached air-supply line 28. The back pressure is detected by the air-pressure detector 26.

When the back pressure is detected by the detector 26, an electrical set of contacts 32 close, indicating that the seal 14 of FIG. 3 is present and correctly oriented. Conversely, if the seal 14 is not orientated correctly, as illustrated in FIG. 4, the air will flow from the sensor orifice 22 through cavity 34 of the seal 14, in the direction of air flow arrows 18, exiting via the vent orifice 24. No back pressure is developed when the seal 14 is oriented incorrectly, therefore the air pressure sensor 26 does not operate, the same as if there was no seal present. In this situation, the pressing machine 10 will not cycle and, therefore, is prevented from continuing, and an alarm will sound to alert the operator that the seal orientation needs to be corrected.

Having described the invention in detail and by reference to the preferred embodiment thereof, it will be apparent that other modifications and variations are possible without departing from the scope of the invention defined in the appended claims.

What is claimed is:

1. A system for detecting the presence of and confirming correct orientation of an oil seal, the oil seal having a first surface capable of providing a fluid tight seal over an orifice in a testing surface when the oil seal is oriented correctly and having a second surface incapable of providing said fluid tight seal when the oil seal is oriented incorrectly, the system comprising:

a testing surface having a sensor orifice and an exit orifice positioned to be sealed by the first surface when the oil seal is present and oriented correctly;

an air supply means for regulating air supplied to the sensor orifice; and an air pressure sensor, whereby when the oil seal is present and correctly oriented with the first surface sealing the sensor orifice a back pressure of air is created at the sensor orifice and the air supply means, the back pressure being detectable by the air pressure sensor to confirm presence and correct orientation of the oil seal and when the oil seal is missing or incorrectly oriented with its second surface covering the sensor orifice no back pressure of air is created or detectable by the air pressure sensor, the air exiting to free space when the oil seal is missing and the air exiting through the exit orifice when the oil seal is incorrectly oriented.

2. A system as claimed in claim 1 further comprising: a flow regulator for regulating flow of air to the sensor orifice; and a pressure regulator for regulating air pressure to the flow regulator, whereby the air supply means supplies air to the pressure regulator.

3. A system as claimed in claim 1 further comprising an electrical contact means whereby when back pressure is detected by the air pressure sensor the electrical contact means close, confirming the presence and orientation of the oil seal.

4. A method for detecting presence of and confirming correct orientation of an oil seal, the oil seal having a first surface capable of providing a fluid tight seal over an orifice in a testing surface when the oil seal is oriented correctly and having a second surface incapable of providing said fluid tight seal when the oil seal is oriented incorrectly, the method comprising the steps of:

providing a testing surface having a sensor orifice and an exit orifice positioned to be sealed by the first surface when the oil seal is present and oriented correctly;

providing a regulated air supply to the sensor orifice; and sensing air pressure at said sensor orifice, whereby when the oil seal is present and correctly oriented with the first surface sealing the sensor orifice a back pressure of air is created at the sensor orifice, the back pressure being detectable to confirm presence and correct orientation of the oil seal and when the oil seal is missing or incorrectly oriented with its second surface covering the sensor orifice no back pressure of air is created or detectable by the air pressure sensor, the air exiting to free space when the oil seal is missing and the air exiting through the exit orifice when the oil seal is incorrectly oriented.

5. A method as claimed in claim 4 wherein the step of providing a regulated air supply comprises the steps of:

regulating flow of air to the sensor orifice with a flow regulator; and regulating air pressure to the flow regulator with a pressure regulator.

6. A method as claimed in claim 4 further comprising the step of providing an electrical contact means whereby when back pressure is detected at the sensor orifice the electrical contact means close, confirming the presence and correct orientation of the oil seal.

* * * * *